(12) United States Patent
Takahashi et al.

(10) Patent No.: US 11,644,825 B2
(45) Date of Patent: May 9, 2023

(54) PRODUCT STATE ESTIMATION DEVICE

(71) Applicants: Kabushiki Kaisha Toshiba, Tokyo (JP); Toshiba Digital Solutions Corporation, Kawasaki (JP)

(72) Inventors: Shintarou Takahashi, Kawasaki (JP); Minoru Nishizawa, Itabashi (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 0 days.

(21) Appl. No.: 17/302,243

(22) Filed: Apr. 28, 2021

(65) Prior Publication Data

US 2021/0247754 A1  Aug. 12, 2021

Related U.S. Application Data

(63) Continuation of application No. PCT/JP2019/043108, filed on Nov. 1, 2019.

(30) Foreign Application Priority Data

Nov. 6, 2018  (JP) .............................. JP2018-209064

(51) Int. Cl.
  *G05B 23/02* (2006.01)
  *G05B 19/418* (2006.01)
  *G06N 3/04* (2023.01)

(52) U.S. Cl.
  CPC ..... *G05B 23/0221* (2013.01); *G05B 19/4183* (2013.01); *G05B 23/024* (2013.01); *G05B 23/0254* (2013.01); *G06N 3/04* (2013.01)

(58) Field of Classification Search
  CPC ............ G05B 23/0221; G05B 19/4183; G05B 23/024; G05B 23/0254; G06N 3/04
  See application file for complete search history.

(56) References Cited

U.S. PATENT DOCUMENTS

5,914,884 A * 6/1999 Gur Ali .................. B29C 45/76
                                                 700/47
6,321,216 B1 * 11/2001 Otte .................. G05B 19/0425
                                                 706/14

(Continued)

FOREIGN PATENT DOCUMENTS

CN    108629365 A    10/2018
CN    108688105 A    10/2018

(Continued)

OTHER PUBLICATIONS

Woll et al., "Online Pattern-Based Part Quality Monitoring of the Injection Molding Process" Polymer Engineering and Science, Mid-Jun. 1996, vol. 36, No. 11 (Year: 1996).*

(Continued)

*Primary Examiner* — John C Kuan
(74) *Attorney, Agent, or Firm* — Maier & Maier, PLLC

(57) ABSTRACT

A product state estimation device includes: an examination result acquisition device that acquires an examination result related to a state of a product obtained through each shot by a die-casting machine; a time series data acquisition device that acquires time series data based on an output from a sensor that detects an operation state of the die-casting machine at each shot; a time series data manipulation device that performs manipulation that clips data of a predetermined time interval out of the time series data; an estimation model generation device that generates an estimation model by using a neural network with the examination result of the product and the manipulated time series data as learning data; and an estimation device that estimates information related to quality of the product based on the manipulated time series data obtained from a plurality of detection signals at each shot by using the estimation model.

8 Claims, 10 Drawing Sheets

(56) References Cited

U.S. PATENT DOCUMENTS

| | | | |
|---|---|---|---|
| 6,845,289 B2 * | 1/2005 | Salewski | G05B 17/02 700/48 |
| 2004/0212115 A1 | 10/2004 | Akiyama et al. | |
| 2007/0192066 A1 | 8/2007 | Ide | |
| 2014/0367892 A1 | 12/2014 | Stone | |
| 2015/0269481 A1 | 9/2015 | Annapureddy et al. | |
| 2015/0379432 A1 | 12/2015 | Ando et al. | |
| 2016/0274561 A1 | 9/2016 | Stone | |
| 2018/0268293 A1 | 9/2018 | Noda | |
| 2018/0281256 A1 | 10/2018 | Asaoka et al. | |

FOREIGN PATENT DOCUMENTS

| | | | |
|---|---|---|---|
| DE | 19743600 B4 * | 3/2006 | ............ G05B 23/02 |
| DE | 10 2018 106 808 A1 | 10/2018 | |
| JP | 57-035737 A | 2/1982 | |
| JP | 2926298 B2 | 7/1999 | |
| JP | 11-207793 A | 8/1999 | |
| JP | 2990404 B2 | 12/1999 | |
| JP | 2000-071303 A | 3/2000 | |
| JP | 2004-216763 A | 8/2004 | |
| JP | 3656121 B2 | 6/2005 | |
| JP | 2007-108998 A | 4/2007 | |
| JP | 2017-516192 A | 6/2017 | |
| JP | 2018-152000 A | 9/2018 | |
| JP | 2018-167424 A | 11/2018 | |
| WO | WO 2014/155690 A1 | 10/2014 | |
| WO | WO 2015/148189 A2 | 10/2015 | |

OTHER PUBLICATIONS

Nagorny et al., "Quality Prediction in Injection Molding: Neural networks geometric dimension prediction on raw signals and thermographic images" 2017 IEEE (Year: 2017).*

Kim et al., "Deep Learning Experiments with Skewed Data for Defect Prediction in Plastic Injection Molding" 2018 IEEE (Year: 2018 ).*

Zhang et al., "Fault diagnosis in injection molding via cavity pressure signals" International Journal of Production Research, vol. 46, No. 22, Nov. 15, 2008, 6499-6512 (Year: 2008).*

* cited by examiner

| TIME POINT | SPEED |
|---|---|
| 2018/09/03 14:03:00.0000 | 0.21 |
| 2018/09/03 14:03:00.0500 | 1.34 |
| 2018/09/03 14:03:00.1000 | 2.56 |
| ⋮ | ⋮ |
| 2018/09/03 14:05:00.0000 | 0.13 |

PRODUCT STATE ESTIMATION DEVICE

CROSS REFERENCE TO RELATED APPLICATION

This application is a continuation application of PCT/JP2019/043108 filed on Nov. 1, 2019 and claims benefit of Japanese Application No. 2018-209064 filed in Japan on Nov. 6, 2018, the entire contents of which are incorporated herein by this reference.

BACKGROUND OF THE INVENTION

1. Field of the Invention

Embodiments of the present invention relate to a product state estimation device.

2. Description of the Related Art

In manufacturing of a product by an injection molding machine or a die-casting machine, a product defect caused by a shot for molding or casting is not found until a later examination process in many cases. In such a case, for example, fabrication processing is performed on a defective product generated by a shot until the examination process after the shot, and thus the fabrication processing is futile.

Conventionally, for example, a technology that performs quality determination of a molded product based on whether change in an injection speed of melted material from an injection molding machine, a screw position of the injection molding machine, or the like within one shot is between predetermined upper and lower limit waveforms has been proposed. Another technology that performs quality determination of a molded product by determining a correlation relation between a measured injection speed waveform and a reference injection speed waveform within one shot based on a predetermined difference rate or similarity rate has been proposed as well.

However, occurrence of minute variation in an operation state such as the injection speed of melted material and a position of a plunger or the like is not considered in determination or estimation of the quality of a product in these proposed technologies. In other words, influence of occurrence of minute variation in an operation state of an injection molding machine or a die-casting machine on determination or estimation of the quality of a product is not considered.

SUMMARY OF THE INVENTION

A product state estimation device of an embodiment is a product state estimation device for estimating a state of a product manufactured by an injection molding machine or a die-casting machine, the product state estimation device including: an examination result acquisition device configured to acquire an examination result related to the state of the product obtained through each shot; a time series data acquisition device configured to acquire time series data based on an output from a sensor configured to detect an operation state of the injection molding machine or the die-casting machine at each shot; a time series data manipulation device configured to perform manipulation that clips data of a predetermined time interval out of the time series data; an examination result storage device configured to store the examination result acquired by the examination result acquisition device; a time series data storage device configured to store, as manipulated time series data, the time series data manipulated by the time series data manipulation device; an estimation model generation device configured to generate, by using a neural network with the examination result and the manipulated time series data as learning data, an estimation model based on any one or more models among an identification model for a label of the examination result, a regression model for an index related to the examination result, a regression model for calculating data of a time point or a time interval in the manipulated time series data through regression from data of another time point or another time interval in the manipulated time series data, and an auto encoder model for compressing and reconstructing the manipulated time series data; an estimation model storage device configured to store the estimation model generated by the estimation model generation device; an estimation device configured to estimate, by using the estimation model stored in the estimation model storage device, information related to quality of the product based on the manipulated time series data at each shot; and an estimation result output device configured to output information related to a result of the estimation by the estimation device.

DETAILED DESCRIPTION OF THE PREFERRED EMBODIMENT(S)

An embodiment will be described below with reference to the accompanying drawings.
(Configuration)

Figure 1:
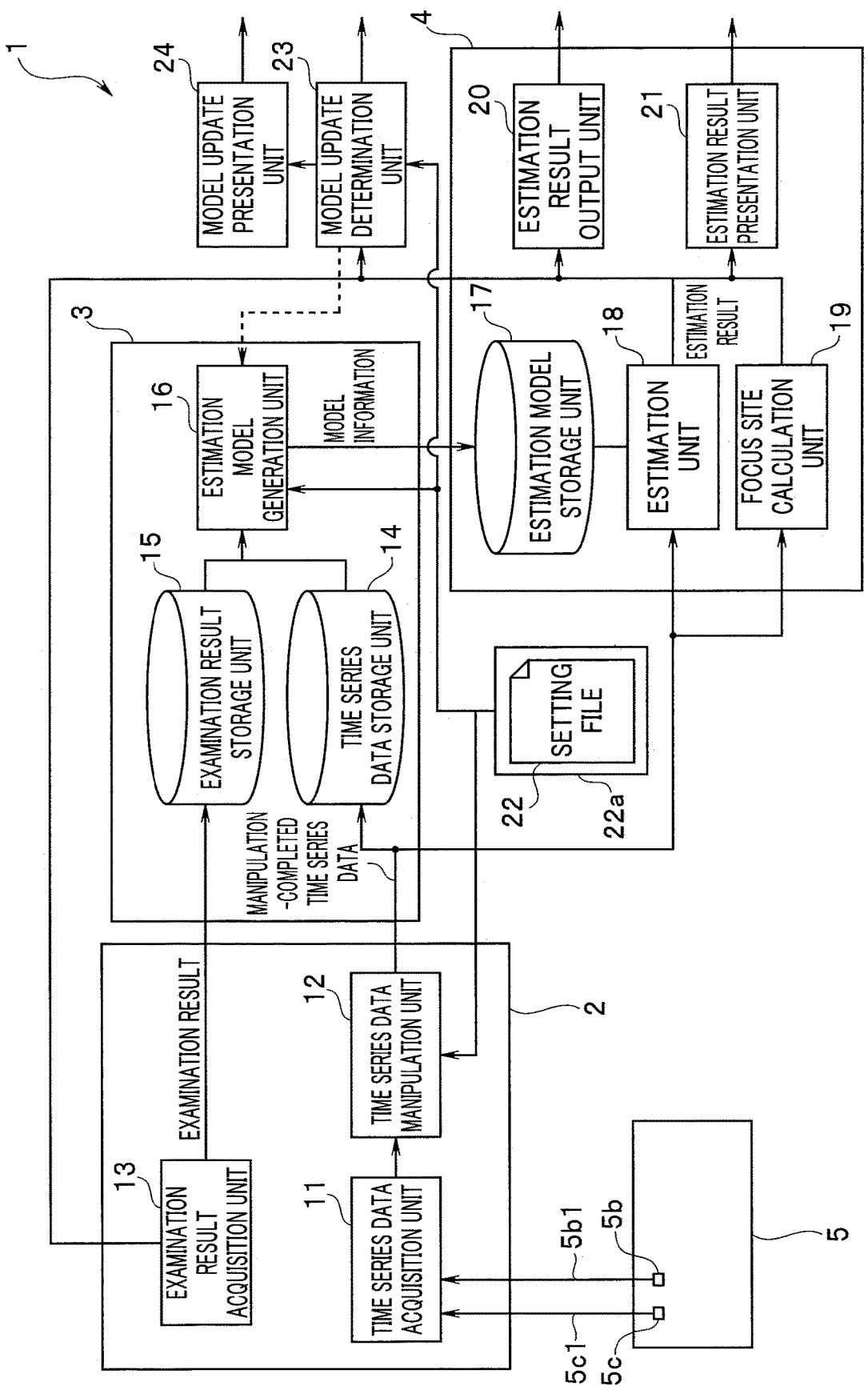
FIG. 1 is a block diagram illustrating a configuration of a product state estimation device according to an embodiment.

FIG. 1 is a block diagram illustrating a configuration of a product state estimation device according to the present embodiment. The product state estimation device 1 is an estimation device for estimating a state of a product manufactured by an injection molding machine or a die-casting machine. Hereinafter, the present embodiment will be described with reference to an example of an estimation device for estimating a state of a product manufactured by a die-casting machine.

The product state estimation device 1 includes a data acquisition device 2, an estimation model generation device 3, and a defect estimation device 4. The product state estimation device 1 is a system for estimating a state of a product manufactured by a die-casting machine 5.

The die-casting machine 5 is controlled by a control device (not illustrated) for a production line, and a shot number and the like are managed by the control device. Each device such as the data acquisition device 2 is controlled by the control device and can store various kinds of data in association with the shot number and the like.

A configuration of each device included in the product state estimation device 1 will be described below.
[Configuration of Data Acquisition Device]

The data acquisition device 2 includes a time series data acquisition unit 11, a time series data manipulation unit 12, and an examination result acquisition unit 13.

The time series data acquisition unit 11 is a device including a circuit configured to receive an analog detection signal from each of various sensors provided to the die-casting machine 5, which will be described later, and convert the analog signal into a digital signal and output the digital signal in a predetermined sampling period. Specifically, the time series data acquisition unit 11 is a time series data acquisition device configured to acquire time series data based on an output from a sensor configured to detect an operation state of the die-casting machine 5 at each shot.

The sensor configured to detect the operation state of the die-casting machine 5 will be described below.

Figure 2:
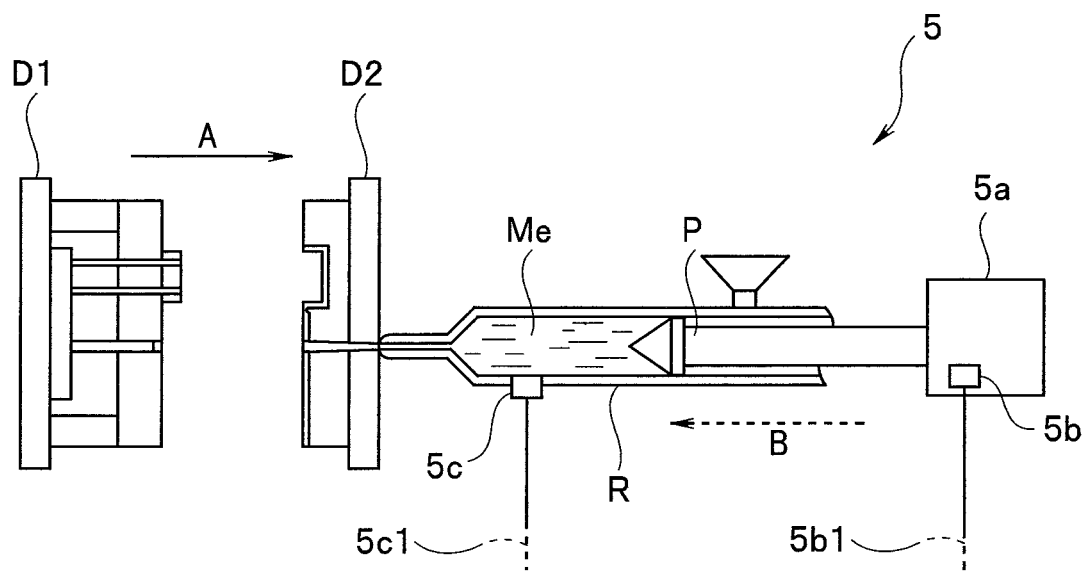
FIG. 2 is a schematic diagram for description of a system of injection of molten metal such as aluminum into a mold cavity in a die-casting machine according to the embodiment.

FIG. 2 is a schematic diagram for description of a system of injection of molten metal such as aluminum into a mold cavity in the die-casting machine 5.

At each shot, among two molds D1 and D2, the mold D1 moves in a direction illustrated with arrow A, closely contacts the mold D2, and is clamped. While the molds D1 and D2 closely contact each other, molten metal Me in a runner R is injected into the mold cavity between the two molds D1 and D2 and fills the mold cavity as a plunger P moves.

Thereafter, the molten metal Me in the mold cavity is cooled while pressure is kept, and then the mold D1 moves in a direction opposite to the direction illustrated with arrow A to open the two molds D1 and D2 so that a cast product thus molded is taken out.

The plunger P is driven by an actuator 5a. The plunger P moves in a direction illustrated with dotted line arrow B when the molten metal Me is injected into the mold cavity. After the injection, the plunger P is moved in a direction opposite to arrow B by the actuator 5a.

A position sensor 5b configured to detect a position of the plunger P in a moving direction is built in the actuator 5a. For example, the position sensor 5b detects the position of the plunger P in the moving direction based on an output from a linear encoder or the like. In addition, a pressure sensor 5c configured to detect pressure in the runner R is provided to the runner R.

An output from the position sensor 5b is supplied as a signal of the position of the plunger P to the time series data acquisition unit 11 of the data acquisition device 2 through a signal line 5b1. An output from the pressure sensor 5c is also supplied as a signal of the pressure in the runner R to the time series data acquisition unit 11 of the data acquisition device 2 through a signal line 5c1.

Note that although the two sensors of the position sensor 5b and the pressure sensor 5c are provided to the die-casting machine 5 in this example, another sensor such as a temperature sensor may be additionally provided to the die-casting machine 5 to detect another operation state of the die-casting machine 5.

A configuration example of time series data acquired by the time series data acquisition unit 11 will be described below.

Figure 3:
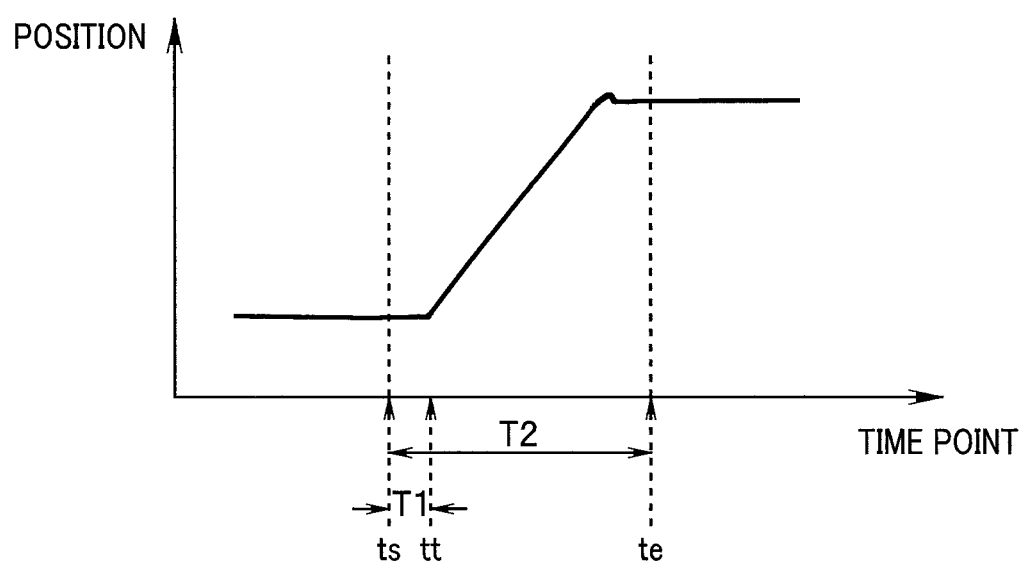
FIG. 3 is a diagram illustrating an example of time series data of a position of a plunger according to the embodiment.

FIG. 3 is a diagram illustrating an example of time series data of the position of the plunger P. FIG. 3 illustrates a graph of data of the position of the plunger P detected by the position sensor 5b along time elapse within one shot.

As illustrated in FIG. 3, the position of the plunger P changes along with time elapse within one shot.

Although not illustrated, the pressure in the runner R changes along time elapse within one shot. The pressure sensor 5c detects the changing pressure in the runner R.

In addition, the time series data acquisition unit 11 also has a function to calculate time series data of a speed of the plunger P from position information of the position sensor 5b.

Figures 4, 5:
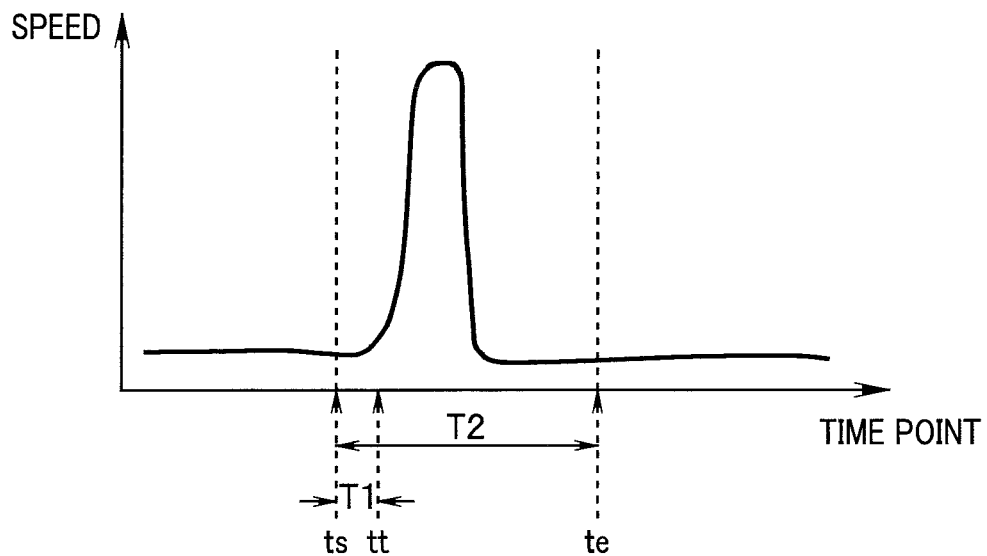
FIG. 4 is a diagram illustrating an example of time series data of a calculated speed of the plunger according to the embodiment.
FIG. 5 is a diagram illustrating an example of time series data of a speed acquired by a time series data acquisition unit according to the embodiment.

FIG. 4 is a diagram illustrating an example of time series data of the calculated speed of the plunger P. The speed of the plunger P is calculated from temporal change of the data of the position of the plunger P. FIG. 4 illustrates a graph of speed change of the plunger P, which is calculated along time elapse within one shot.

As illustrated in FIG. 4, the speed of the plunger P also changes along with time elapse within one shot.

An output signal of each sensor is sampled in a predetermined sampling period, and each time series data is converted into digital data.

The time series data acquisition unit 11 includes a clock circuit and has a time stamp function. The time series data acquisition unit 11 adds time point information to acquired data and outputs the acquired data. In other words, the time series data acquisition unit 11 adds time point information to digital data by the time stamp function.

Note that the time point information by the time stamp function is associated with time series data in this example, but counter information of an internal timer may be used in place of the time point information.

Information of the position of the plunger P and information of the pressure in the runner R each include time point information. Each time series data can be associated with each other based on the included time point information, and thus pieces of data included in a plurality of pieces of time series data can be synchronized as described later.

FIG. 5 is a diagram illustrating an example of time series data of a speed acquired by the time series data acquisition unit 11. FIG. 5 illustrates an example of speed data of the plunger P.

Thus, the time series data of the speed is time series data in which speed data is associated with time point information as illustrated in FIG. 5.

Similarly to the speed data, data of the position of the plunger P and data of the pressure in the runner R are also each time series data in which a detected value is associated with time point information.

Referring back to FIG. 1, the time series data manipulation unit 12 is a circuit configured to provide predetermined manipulation on detection signals from the two sensors.

The time series data manipulation unit 12 is a circuit having functions to synchronize a plurality of pieces of time series data from the time series data acquisition unit 11, clip the plurality of pieces of time series data, connect the plurality of pieces of time series data, and produce trajectory data from the plurality of pieces of time series data. In other words, the time series data manipulation unit 12 is a time series data manipulation device configured to perform manipulation of, for example, clipping data of a predetermined time interval out of time series data.

Note that at least some functions of processing at the time series data acquisition unit 11 and the time series data manipulation unit 12 may be executed by software. In this case, the data acquisition device 2 includes a processor including a central processing unit (hereinafter referred to as a CPU), a ROM, and a RAM, and a software programs corresponding to each function and stored in the ROM is read, loaded onto the RAM, and executed by the CPU.

In the present embodiment, generation of an estimation model M and estimation of a product state are performed by using time series data of the position of the plunger P based on a detection signal from the position sensor 5b and time series data of the pressure in the runner R based on a detection signal from the pressure sensor 5c, as well as time series data of the calculated speed of the plunger P.

Note that, the above-described three pieces of time series data of position, pressure, and speed are used in the present embodiment, but time series data of an injection speed of the molten metal, which is calculated from the information of the position of the plunger P, injection pressure of the molten metal, which is calculated from the information of the pressure in the runner R, and the like may be used.

Accordingly, the time series data manipulation unit 12 performs synchronization, clipping, connections, and trajectory data production on time series position data, time series pressure data, and time series speed data. The time series data thus manipulated is supplied to the estimation model generation device 3.

Specific methods of synchronization, clipping, connection, and trajectory data production of a plurality of pieces of time series data will be described later.

The time series data acquisition unit 11 and the time series data manipulation unit 12 serve as an operation state data acquisition device configured to acquire data of the operation state of the die-casting machine 5.

An output from the time series data manipulation unit 12 is stored in a time series data storage unit 14 to be described later and is used at generation of the estimation model M.

The time series data acquisition unit 11 and the time series data manipulation unit 12 perform acquisition and manipulation, respectively, of time series data for each shot at operation of the die-casting machine 5, and the time series data manipulation unit 12 outputs the manipulated time series data (hereinafter also referred to as manipulation-completed time series data) to the defect estimation device 4.

An examination result acquisition unit 13 includes an input device for inputting data. The examination result acquisition unit 13 of the data acquisition device 2 includes a processor including a CPU and the like.

A user such as a skilled person inputs state information of a product manufactured by the die-casting machine 5 as an examination result of each shot by using the input device of the examination result acquisition unit 13, and accordingly, the examination result acquisition unit 13 acquires information of the examination result. In other words, the examination result acquisition unit 13 is an examination result acquisition device configured to acquire an examination result related to a state of a product obtained through each shot, for example, a numerical value indicating non-defective, defective, or degree.

Information of the state of a product is information indicating "non-defective" or "defective". "Non-defective" means that a die-casting product is a non-defective product, and "defective" means that the die-casting product is a defective product.

Note that the information of the state of a product is label information indicating "non-defective" or "defective" in this example, but for example, the kind of a defect may be further divided and labeled and three or more pieces of label information such as "non-defective", "defect A", and "defect B" may be used, or the information of the state of a product may be a numerical value as an index indicating a degree of quality.

Input information of the state of a product is supplied as examination result information IS to the estimation model generation device 3. The examination result information is provided with an identifier such as the shot number and transmitted to the estimation model generation device 3. The examination result information IS is stored in an examination result storage unit 15 to be described later.

Note that the data acquisition device 2 may be configured as one device, or the operation state data acquisition device including the time series data acquisition unit 11 and the time series data manipulation unit 12, and the examination result acquisition unit 13 may be configured as separate devices. For example, the examination result acquisition unit 13 may be a personal computer.

Figure 6:
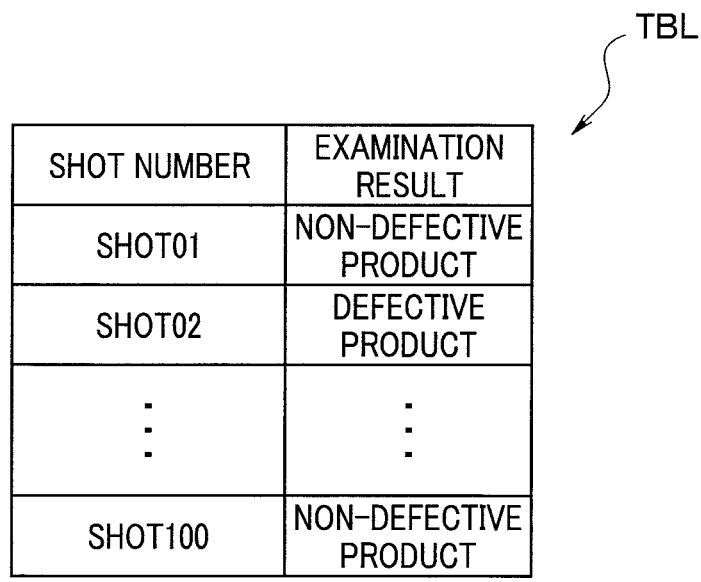
FIG. 6 is a table indicating a configuration example of examination result information stored in an examination result storage unit according to the embodiment.

FIG. 6 is a table indicating a configuration example of examination result information stored in the examination result storage unit 15. As illustrated in FIG. 6, the examination result information IS is stored in a table TBL in association with the shot number.

For example, the user executes a predetermined number of shots and inputs a predetermined number of examination results to the examination result acquisition unit 13.

Note that the examination result information IS input to the examination result acquisition unit 13 and generated is stored as table data for collection of a plurality of shoot as illustrated in FIG. 6 in this example, but may be stored in another format. For example, an examination result of each shot may be stored by a method of, for example, storing time series data of the shot in a directory in accordance with the examination result.

Manipulation to be performed by the time series data manipulation unit 12 may be specified by the user. The user inputs and sets setting information for specifying a manipulation method and the like to a predetermined setting file 22. The time series data manipulation unit 12 refers to setting data of the setting file 22 set by the user in advance and the like and acquires setting information related to manipulation of time series data.

The setting file 22 is stored in a storage medium 22a such as a memory card. The storage medium 22a is mounted on the data acquisition device 2 through a card interface (not illustrated), and setting data is read by the time series data manipulation unit 12. Note that setting data may be input to another device and transmitted from the other device to the data acquisition device 2 through communication or the like.

Subsequently, data manipulation will be described below.

The time series data manipulation unit 12 performs, in accordance with acquired setting contents, manipulation on each time series data acquired by the time series data acquisition unit 11.

As described above, the time series data manipulation unit 12 has the synchronization function to synchronize a plurality of pieces of time series data, the clipping function to clip data of a desired interval out of each time series data, the connection function to connect a plurality of pieces of time series data, and the conversion function to convert two or more pieces of time series data into trajectory data. Whether to use each function, and detailed processing contents and necessary setting values of each function are specified by the setting file 22.

The time series data synchronization function is a function to perform time setting of a plurality of pieces of time series data by using time point information by the time stamp function and counter information of the internal timer, which are included in each time series data.

Note that the synchronization function may include a function to unify time series data to a sampling rate set in advance by performing data interpolation and decimation on the time series data when a sampling rate is different between time points in the time series data.

The synchronization function may also include a function to perform adjustment to a sampling rate and a timing set in advance or a sampling rate and a timing of particular time series data by performing data interpolation and decimation when a sampling rate and a sampling timing are different between a plurality of pieces of time series data.

The time series data clipping function is a function to clip data of a time interval set in advance out of each time series data. The interval of clipping may be different for each time series data. Specifically, clipping intervals of three pieces of time series data may be a same time interval from a first time point to a second time point, or the clipping interval of at least one of the three pieces of time series data may be different from the clipping intervals of the other time series data.

Alternatively, a clipping interval may be determined with reference to particular time series data, and the time series data or other time series data may be clipped based on the determined clipping interval.

For example, when it is detected at a time point tt that a change amount of time series speed data has become equal to or larger than a predetermined value as illustrated in FIG. 4, a time point ts before the time point tt by a predetermined time T1 is set as a clipping start time, and when te represents a time point after the time point ts by a predetermined time T2, a time from the time point ts to the time point te is determined as a clipping interval. A change amount of speed is a difference between speed at a time point and speed at a previous time point. The clipping interval from the time point ts to the time point te is determined with reference to a time point when this difference in a speed value becomes larger or smaller than a predetermined threshold value.

In FIG. 4, a timing when the difference in the speed value exceeds the predetermined threshold value is detected. In FIG. 4, time series data of the speed value from the speed value at the time point ts as a start time point of the clipping interval to the time point te as an end time point of the clipping interval is time series speed data after clipping.

Time series position data and time series pressure data may be clipped for the interval from the time point ts to the time point te, which is same as the clipping interval determined based on time series speed data. In this case, as illustrated in, for example, FIG. 3, time series data of a clipping interval same as that of time series speed data is clipped out of time series position data. This is same for time series pressure data.

In addition, a time interval of one shot may be divided into a plurality of predetermined intervals, and one predetermined interval among the plurality of intervals may be set as the clipping interval.

Note that the clipping interval is one in the above description, but there may be a plurality of clipping intervals.

As described above, the time series data acquisition unit 11 can acquire a plurality of pieces of time series data, and the time series data manipulation unit 12 can synchronize the plurality of acquired pieces of time series data and then clip a plurality of pieces of data of a predetermined time interval out of the plurality of pieces of time series data.

The time series data connection function is a function to connect a plurality of pieces of time series data. With this function, for example, a plurality of pieces of clipped time series data can be arranged and connected so that values of the same time point are grouped. The plurality of clipped pieces of time series data may be connected so that each time series data is connected at end of other time series data.

Figure 7:
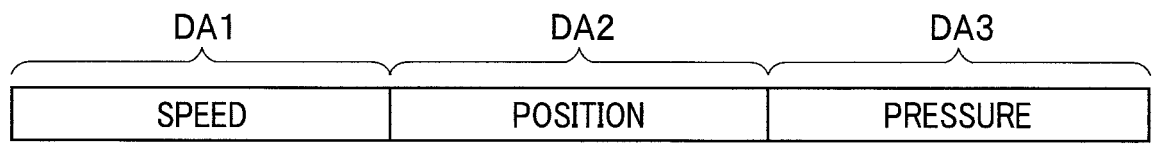
FIG. 7 is a diagram illustrating an example of time series data in which three pieces of time series data are connected in series as one piece of vector data according to the embodiment.

FIG. 7 is a diagram illustrating an example of time series data in which three pieces of time series data are connected in series as one piece of vector data.

In this example, the pieces of time series data sequentially include time series speed data DA1, time series position data DA2, and time series pressure data DA3. In FIG. 7, the time series data DA2 of the position of the plunger P is connected at end of the time series data DA1 of the speed of the plunger P, and the time series data DA3 of the pressure in the runner R is connected at end of the time series data DA2 of the position of the plunger P.

The time series data DA1, DA2, and DA3 is, for example, time series data among which time-point synchronization is achieved by the synchronization function and that is clipped for the same interval. Time series data coupled in series as illustrated in FIG. 7 is effective when a fully-connected neural network or a convolutional neural network is used.

Figure 8:
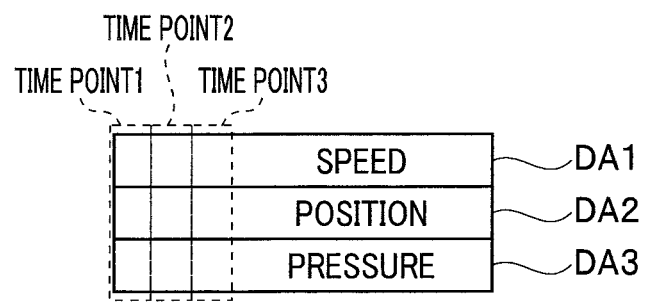
FIG. 8 is a diagram illustrating an example of time series data in which three pieces of time series data are connected in parallel according to the embodiment.

FIG. 8 is a diagram illustrating an example of time series data in which three pieces of time series data are connected in parallel.

FIG. 8 is effective when a vector in which three values of the same time point are arranged and collected is taken, in an order of time points, out of three pieces of time series data connected in parallel and sequentially input to a recurrent neural network of long short-term memory (LSTM). As illustrated in FIG. 8, the three pieces of time series data are connected in parallel so that three pieces of data of the same time point are grouped as one.

Time series data coupled in parallel as illustrated in FIG. 8 is effective also when a fully-connected neural network or a convolutional neural network is used.

Figure 9:
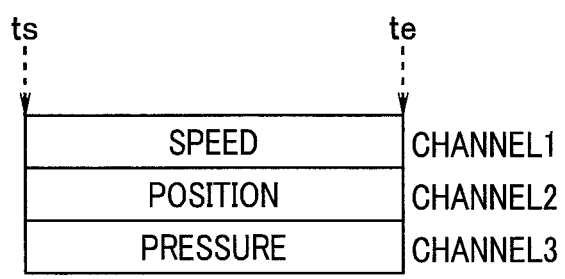
FIG. 9 is a diagram illustrating an example of a plurality of pieces of time series data associated and connected in a manner corresponding to a plurality of input channels according to the embodiment.

FIG. 9 is a diagram illustrating a plurality of pieces of an example of time series data associated and connected in a manner corresponding to a plurality of input channels. In this example, three pieces of time series data are associated with three input channels. Specifically, when a number of input channels of a neural network is three, three pieces of time series data of speed, position, and pressure are connected so that the three pieces of time series data are supplied to channels 1, 2, and 3, respectively.

The three pieces of time series data are data from the same time point is to the same time point te.

Time series data coupled in parallel as illustrated in FIG. 9 is effective when a convolutional neural network is used.

The function of conversion from time series data to trajectory data is a function to convert a plurality of pieces of time series data into trajectory data in a predetermined space. Specifically, the time series data manipulation unit 12 performs manipulation that converts a plurality of pieces of time series data into trajectory data by plotting the plurality of pieces of time series data in a dimensional space having axes corresponding to the respective pieces of time series data and by connecting a plurality of plotted coordinates in the dimensional space in the order of time points with lines.

For the conversion function, first, an N-dimensional space having dimensions corresponding to a number of pieces of time series data is defined for a plurality (in this example, three) of pieces of time series data. The number N is an integer indicating the number of pieces of time series data (in this example, N is three). Then, for each time point, a position vector in which N values of a plurality of pieces of time series data of the time point are arranged is plotted to a coordinate in the N-dimensional space. Then, the plotted coordinates are connected with lines along time elapse, in other words, in the order of time points, and accordingly, trajectory data is produced.

The produced trajectory data is effective, for example, when a convolutional neural network is used. Since trajectory data produced from two pieces of time series data can be converted into a two-dimensional graph image, the graph image may be input to convolutional neural network. In this case, a thickness of each line may be changed in accordance with a size of fluctuation of a sampling period, a sensor detection error, or the like. For example, when the sensor detection error is larger than a predetermined value, a trajectory is drawn with bold lines.

Thus, for example, when two pieces of time series data are selected, the trajectory data can be expressed as image data on a screen of a display device. In other words, when the dimensional space of the conversion function is a two-dimensional space, the trajectory data can be displayed as two-dimensional data on the display device.

Figure 10:
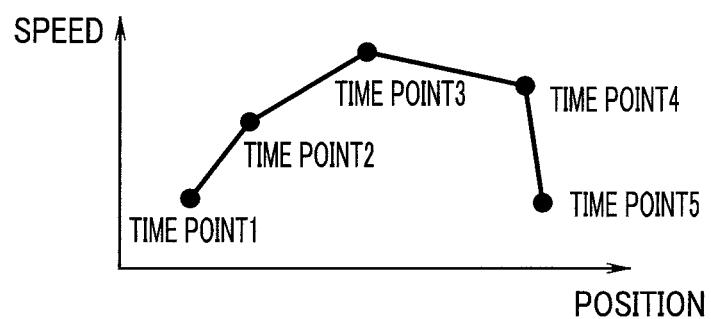
FIG. 10 is a graph illustrating a trajectory based on two pieces of time series data according to the embodiment.

FIG. 10 is a graph illustrating a trajectory based on two pieces of time series data. In this example, for simplification of illustration, data of speed and position at five time points 1, 2, 3, 4, and 5 is illustrated in a graph. In FIG. 10, for simplification of illustration, the graph is illustrated with lines connecting a point corresponding to speed and position at each of the five time points and two adjacent points of the five time points.

Figure 11:
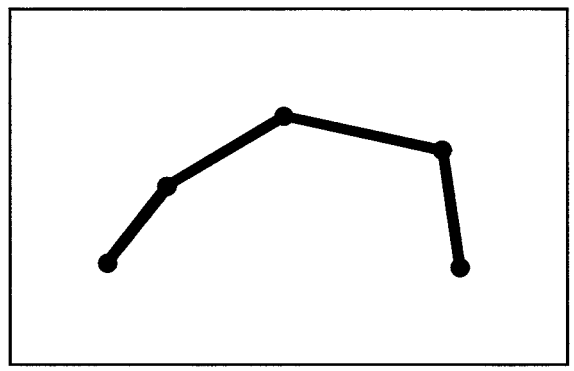
FIG. 11 is a graph image displayed on a display device according to the embodiment.

FIG. 11 is a graph image displayed on the display device. The graph image of FIG. 11 is input to a convolutional neural network.

In the graph image, colors of points and lines on the graph may be changed in accordance with a time point. For example, the colors of points and lines on the graph are changed in accordance with change of a color from red to blue from a start time point to an end time point of data used for estimation.

When there are three or more pieces of time series data, selection of two pieces of time series data from among the three or more pieces of time series data and generation of an image of trajectory data may be performed for all combinations to generate a plurality of images of trajectory data.

Alternatively, a plurality of images of trajectory data may be generated while a range of time points for expression as trajectory data is changed, and these images may be treated as moving image data.

Alternatively, when there are three or more pieces of time series data, for example, a method of expressing trajectory data as follows is applicable.

First, an N-dimensional matrix is defined, and all elements are set to be a constant value X0 (for example, zero). Subsequently, an element of the N-dimensional matrix, which corresponds to a coordinate of a position vector in which the values of a plurality of pieces of time series data for each time point are arranged is changed to a particular value X1 (for example, one). Thereafter, the coordinates (elements in the N-dimensional matrix) for time points adjacent to each other are connected through a line, and an element of the N-dimensional matrix at a position sufficiently close to the line is changed to the particular value X1 (for example, one). Accordingly, conversion into trajectory data is possible. Note that the value X1 may be changed in accordance with a time point in time series data.

As described above, the time series data manipulation unit 12 has the functions to perform, based on setting information in the setting file 22, synchronization of a plurality of pieces of time series data, clipping of each time series data, connection of a plurality of pieces of time series data, and conversion into trajectory data, and optional one function or optional two or more functions are selected to manipulate a plurality of pieces of time series data. Manipulation-completed time series data is input to a neural network.

The setting file 22 is stored in the storage medium 22a such as a memory card and forwarded to a storage device (not illustrated) of the data acquisition device 2 through an interface (not illustrated) of the data acquisition device 2. The time series data manipulation unit 12 can refer to the setting information stored in the setting file 22.

The data acquisition device 2 performs various kinds of data manipulation such as synchronization described above on a plurality of pieces of time series data obtained for each shot, and outputs manipulation-completed time series data.

The manipulation-completed time series data is supplied to the estimation model generation device 3 and stored in the time series data storage unit 14. The manipulation-completed time series data can be supplied to the defect estimation device 4.

The examination result acquisition unit 13 outputs input examination result information to the estimation model generation device 3, and the examination result information is stored in the examination result storage unit 15.

[Configuration of Estimation Model Generation Device]

The estimation model generation device 3 includes the time series data storage unit 14, the examination result storage unit 15, and an estimation model generation unit 16.

The time series data storage unit 14 is a storage device configured to store manipulation-completed time series data from the time series data manipulation unit 12. In other words, the time series data storage unit 14 is a time series data storage device configured to store, as manipulation-completed time series data, time series data manipulated by the time series data manipulation unit 12.

The time series data storage unit 14 stores time series data detected for each shot from the die-casting machine 5.

Each time series data is distinguished based on an identifier such as the shot number and stored in the time series data storage unit 14.

The identifier such as the shot number is used for association of a plurality of pieces of time series data and association between a product manufactured by the die-casting machine 5 and an examination result.

The examination result storage unit 15 is a storage device configured to store the examination result information IS from the examination result acquisition unit 13. In other words, the examination result storage unit 15 is an examination result storage device configured to store an examination result acquired by the examination result acquisition unit 13.

The estimation model generation unit 16 generates an estimation model using a neural network, by using, as learning data, time series data stored in the time series data storage unit 14 and a plurality of pieces of examination result information IS stored in the examination result storage unit 15.

Specifically, the estimation model generation unit 16 generates an estimation model through deep learning by using the examination result information IS for a plurality of shots, which is stored in the examination result storage unit 15, and time series data for the plurality of shots, which is stored in the time series data storage unit 14.

Figure 12:
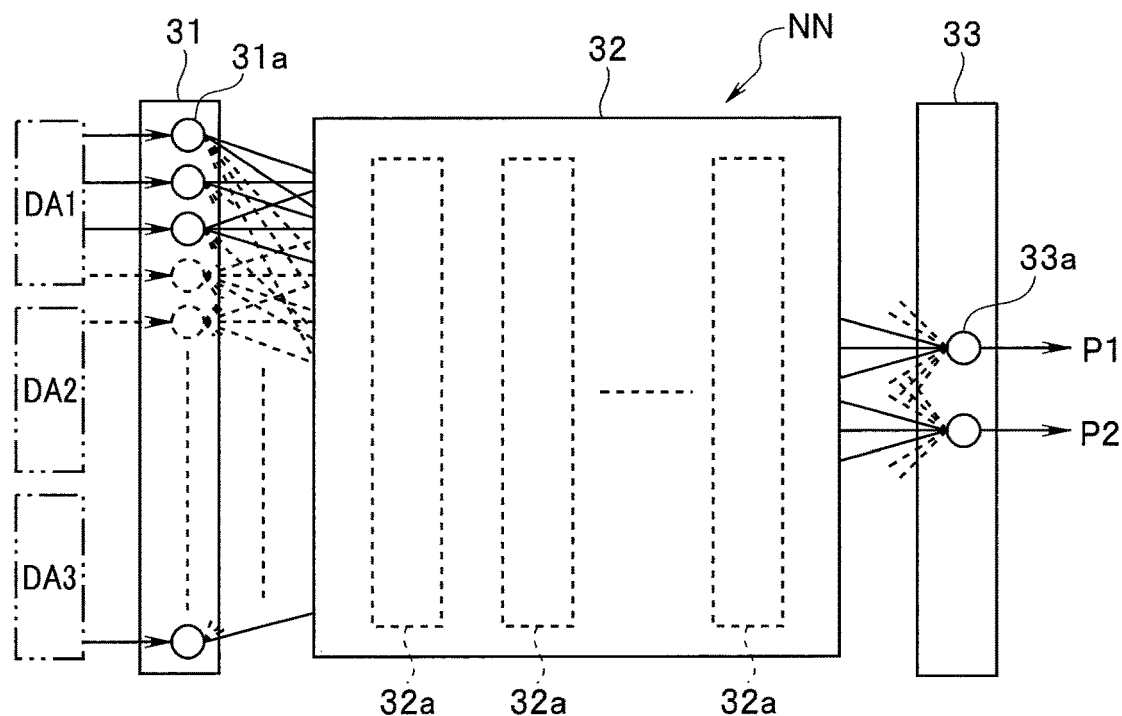
FIG. 12 is a diagram illustrating a configuration example of a neural network according to the embodiment.

FIG. 12 is a diagram illustrating a configuration example of a neural network. The estimation model M is generated by using a neural network NN illustrated in FIG. 12.

The neural network NN includes an input layer 31, a hidden layer 32, and an output layer 33. In FIG. 12, the input layer 31 includes input units 31a, which are illustrated as circles, in a number equal to a number of elements of data included in time series data for one shot.

Manipulation-completed time series data from the time series data manipulation unit 12 is input to the input layer 31. For example, in FIG. 12, the coupled time series data illustrated in FIG. 7 is input to the input layer 31. In this case, the number of input units 31a in the input layer 31 is equal to a number of elements of the coupled time series data, and each element in the time series data is input to the corresponding one input unit 31a.

The hidden layer 32 has a multi-layer structure including a plurality of hidden layers 32a.

In this example, the output layer 33 includes two output units 33a, a first output unit outputs a probability of "non-defective", and a second output unit outputs a probability of "defective".

Although FIG. 12 illustrates an example in which a plurality of pieces of coupled time series data as illustrated in FIG. 7 are input to the input layer 31, the time series data in FIG. 8 or the time series data in FIG. 9 may be input.

In a case of the three pieces of time series data combined in parallel as illustrated in FIG. 8, for example, three pieces of time series data synchronized for each time point are input to the three input units 31a of the input layer 31 in the order of time points.

In a case of the three pieces of time series data combined in parallel as illustrated in FIG. 9, for example, the neural network NN is a convolutional neural network in which the input layer 31 has channels (in the example illustrated in FIG. 9, three channels) in a number equal to a number of pieces of input data, and each time series data is input to a corresponding channel of the input layer.

The estimation model generation device 3 includes a processor including hardware such as a CPU, a ROM, and a RAM and executes a software program configured to generate the estimation model M. The estimation model generation unit 16 is a model generation program stored in a storage device such as a ROM and read and executed by a CPU.

The estimation model generation unit 16 generates model information MI of the generated estimation model M and transmits the model information MT to the defect estimation device 4. The model information MI includes configuration data related to the neural network NN and various kinds of parameter data such as weight coefficients.

The generated estimation model M is an identification model for a label corresponding to an examination result.

Note that although the estimation model M for identifying a label is generated from learning data having two labels of "non-defective" and "defective" in this example, an identification model for three or more labels may be generated. The estimation model M may be a model obtained by learning characteristics of time series data corresponding to some labels among all labels of an examination result. For example, a model may be produced by using time series data of "non-defective" only as learning data. In this case, a model obtained by learning characteristics of the time series data is, for example, a model for calculating the time series data through regression, or an auto encoder model for inputting and reconstructing the time series data.

A structure of the estimation model M generated by the estimation model generation unit 16, a format of input data to the estimation model M, and a method of inputting to the estimation model M are set in accordance with the number of pieces of time series data and contents of manipulation performed by the time series data manipulation unit 12.

For example, when the number of pieces of time series data is one or when the time series data manipulation unit 12 generates one-dimensional data by coupling each time series data at end of other time series data as illustrated in FIG. 7, manipulation-completed time series data may be directly input to a typical fully-connected multi-layer perceptron or a convolutional neural network (CNN) targeted for one-dimensional data. The one-dimensional data may be input to a recurrent neural network (RNN) in the order of time points.

Alternatively, for example, a plurality of pieces of time series data synchronized with each other as illustrated in FIG. 9 may be input to corresponding input channels of a convolutional neural network (CNN).

When the time series data manipulation unit 12 generates trajectory data, the trajectory data may be input to a convolutional neural network (CNN). When there are a plurality of pieces of trajectory data, each piece may correspond to an input channel of a convolutional neural network (CNN).

In addition, vector data in which values for a same time point are paired may be generated from the plurality of pieces of time series data synchronized with each other as illustrated in FIG. 8, and the vector data may be input to a recurrent neural network in the order of time points.

When the time series data manipulation unit 12 generates a plurality of pieces of trajectory data, the pieces of trajectory data may be sequentially input to a recurrent neural network (RNN).

Note that when an examination result is expressed by numerical values, a generated model may be a regression model for an index related to the examination result.

Specifically, the estimation model M is an estimation model based on an identification model for a label of an examination result, which is learned by using a neural network with the examination result and manipulated time series data as learning data, a regression model for an index related to the examination result, a regression model for calculating data of a time point or a time interval in the manipulated time series data through regression from data of another time point or another time interval in the manipulated time series data, and an auto encoder model for compressing and reconstructing the manipulated time series data.

Alternatively, the estimation model M may be configured as a combination of two or more of the models.

The estimation model M generated by the estimation model generation unit 16 may include any one or more of the three neural networks of a fully-connected multi-layer perceptron, a convolutional neural network (CNN), and a recurrent neural network (RNN). The estimation model M generated by the estimation model generation unit 16 may use another neural network of any structure.

The structure of the estimation model M generated by the estimation model generation unit 16 is set by the setting file 22 or the like.

As illustrated in FIG. 1, the setting file 22 is stored in the storage medium 22a such as a memory card and forwarded to a storage device (not illustrated) of the estimation model generation device 3 through an interface (not illustrated) of the estimation model generation device 3. The estimation model generation unit 16 can refer to the setting information stored in the setting file 22.

The estimation model generation unit 16 transmits the model information MI of the generated estimation model M to the defect estimation device 4. The model information MI is stored in an estimation model storage unit 17 to be described later.

As described above, the estimation model generation device 3 generates the estimation model M by using learning data and outputs the model information MI to the defect estimation device 4.

[Configuration of Defect Estimation Device]

The defect estimation device 4 includes the estimation model storage unit 17, an estimation unit 18, a focus site calculation unit 19, an estimation result output unit 20, and an estimation result presentation unit 21.

The estimation model storage unit 17 is a storage device configured to store and save the model information MI of the estimation model M from the estimation model generation device 3. In other words, the estimation model storage unit 17 stores information of the estimation model M generated by the estimation model generation unit 16.

The estimation unit 18 estimates whether a product is defective based on manipulation-completed time series data from the time series data manipulation unit 12 for each shot by using the model information MI of the estimation model M stored in the estimation model storage unit 17, and outputs estimation result information IJ.

Specifically, the estimation unit 18 serves as an estimation unit configured to estimate, by using the estimation model M stored in the estimation model storage unit 17, information related to quality of a product based on manipulation-completed time series data obtained from a plurality of detection signals at each shot.

After the estimation unit 18 calculates an estimation result, the focus site calculation unit 19 performs calculation of a focus site. The focus site is an element particularly focused in input data when the estimation model M calculates the estimation result.

The calculation of the focus site is performed, for example, as follows. When the estimation model M is an identification model for a label indicating an examination result or a regression model for an index related to the examination result, values of any one or more output units 33a of the output layer 33 of the estimation model M, or values calculated based on the values are partially differentiated with elements of time series data input to the estimation model M. An element of the time series data corresponding to a part at which an absolute value of a partially differentiated value is large is extracted as the focus site.

An output value from the estimation model M or a value calculated based on the output value is partially differentiated with each element of input time series data, and a part at which an absolute value of a value obtained through the partial differentiation is large is set as the focus site.

Specifically, the focus site calculation unit 19 calculates, as the focus site, part of the manipulation-completed time series data focused when the estimation model M used by the estimation unit 18 to estimate information related to the quality of a product calculates the estimation result, by partially differentiating, based on manipulation-completed time series data, output data from the estimation model or a value calculated based on the output data or by comparing output data of the estimation model or part of the output data with manipulated time series data or part of the manipulated time series data.

When the estimation model M is a model for calculating time series data through regression or an auto encoder model for inputting and reconstructing time series data, for example, an error between a value calculated through regression and an actual value or an error between reconstructed data and input time series data may be calculated, and an element of the time series data, which corresponds to a part at which an absolute value of the error is large may be extracted as the focus site.

The focus site calculation unit 19 transfers information of the calculated focus site to the estimation result presentation unit 21.

The estimation result presentation unit 21 presents the estimation result transferred from the estimation unit 18 and simultaneously presents the focus site calculated by the focus site calculation unit 19.

Figure 13:
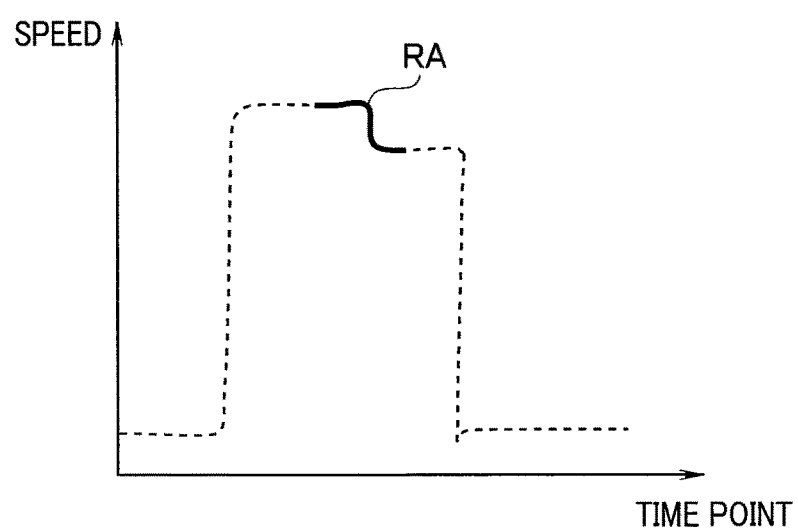
FIG. 13 is a diagram illustrating a presentation example of a focus site according to the embodiment.

FIG. 13 is a diagram illustrating example presentation of the focus site.

FIG. 13 illustrates time series data of the speed of the plunger P as waveform data with a dashed line, and illustrates a focus site RA with a bold solid line.

When an input to the estimation model M is image data, an image in which the focus site is colored may be transparently displayed over the image data.

Referring back to FIG. 1, the defect estimation device 4 includes a processor including a CPU, a ROM, and a RAM and executes computer programs of the estimation unit 18 and the focus site calculation unit 19. The estimation unit 18 and the focus site calculation unit 19 are computer programs stored in a storage device such as a ROM and read and executed by a CPU.

The estimation result output unit 20 is a circuit configured to output the estimation result information IJ of the estimation unit 18 to the control device configured to control various devices on the production line. In other words, the estimation result output unit 20 is an estimation result output device configured to output information related to the estimation result from the estimation unit 18.

For example, various devices on the production line perform processing such as removing a product determined as a defective product from the production line so that the product is not manipulated at a later process.

The estimation result presentation unit 21 is a circuit for notifying, through presentation, the user of predetermined information in accordance with the estimation result from the estimation unit 18. In other words, the estimation result presentation unit 21 presents the estimation result from the estimation unit 18 to notify the user of the estimation result.

For example, when it is estimated that a manufactured product is defective, the estimation result presentation unit 21 notifies the user that the manufactured product is a defective product by outputting an output signal for displaying a predetermined message to the display device or by outputting an output signal for predetermined warning display to a predetermined display lamp.

[Configuration of Model Update Device]

The product state estimation device 1 includes a model update determination unit 23 and a model update presentation unit 24. The model update determination unit 23 and the model update presentation unit 24 serve as a model update device. The model update determination unit 23 and the model update presentation unit 24 may be included in the defect estimation device 4 or the data acquisition device 2, and the data acquisition device 2 and the defect estimation device 4 may be configured as separate devices.

The estimation result information IJ from the estimation unit 18 is also supplied to the model update determination unit 23.

The model update determination unit 23 accumulates the estimation result information IJ for each shot from the estimation unit 18. In other words, the estimation result information IJ associated with the shot number is accumulated in the model update determination unit 23.

The model update determination unit 23 is also connected with the examination result acquisition unit 13.

As described above, the examination result information IS associated with the shot number is accumulated in the examination result acquisition unit 13.

The model update determination unit 23 determines whether the estimation model M needs to be updated, based on the estimation result from the estimation unit 18 or based on the estimation result from the estimation unit 18 and the examination result acquired by the examination result acquisition unit 13.

When a predetermined number of pieces of the estimation result information IJ is accumulated and the examination result information IS corresponding to the estimation result information IJ is obtained from the examination result acquisition unit 13, the model update determination unit 23 collates the estimation result from the estimation unit 18 with the correct examination result obtained by the examination result acquisition unit 13.

As a result of the collation, when an index indicating difference between the estimation result from the estimation unit 18 and the correct examination result is equal to or larger than a threshold value TH set in advance, the model update determination unit 23 determines that model update is needed, and transmits information for prompting model update to the model update presentation unit 24.

The index indicating the difference between the estimation result from the estimation unit 18 and the correct examination result is, for example, an incorrect answer rate indicated in Equation (1) below.

$$\text{Incorrect answer rate} = (\text{number of shots with false estimation results})/(\text{number of shots for which estimation result and examination result are collated}) \quad (1)$$

In a case of Equation (1), it is determined that model update is needed when the incorrect answer rate is equal to or higher than the threshold value set in advance.

Note that the index may be a correct answer rate indicated in Equation (2) below.

$$\text{Correct answer rate} = (\text{number of shots with correct estimation results})/(\text{number of shots for which estimation result and examination result are collated}) \quad (2)$$

In a case of Equation (2), it is determined that model update is needed when the correct answer rate is less than a threshold value set in advance.

The index may be an index other than Equations (1) and (2).

When the estimation model outputs a regression result of an index value related to the examination result, the regression result may be compared with a correct index value by calculating an average square error, an average absolute error, or the like, and it may be determined that model update is needed when the error is large.

Having received the information for prompting model update, the model update presentation unit 24 prompts the user to perform model update by displaying message information instructing model update or the like on, for example, a monitor. When the user sees the message information or the like and determines that model update is to be performed, the estimation model generation device 3 performs estimation model generation processing by using new data and generates a new model.

Note that model update may be automatically performed without determination by the user. In this case, the model update determination unit 23 transmits a model update instruction command to the estimation model generation unit 16 as illustrated with a dotted line in FIG. 1. As a result, the estimation model generation unit 16 having received the model update instruction command automatically executes estimation model generation processing by using new data and generates a new model.

Note that a method described above is a method of determining model update by using a correct examination result, but whether model update is needed may be determined by using only the estimation model M, in other words, a result output from the estimation unit 18. In this case, there is an advantage that whether model update is needed can be determined before a correct examination result is obtained.

For example, model update is determined by sensing that tendency of the output result from the estimation unit 18 has changed from output so far. Consider a case in which the output result from the estimation unit 18 for a plurality of shots in a predetermined past duration is tallied to find that, for example, non-defective product determination is 90% and defective product determination is 10% but tallying for a plurality of latest shots finds that, for example, non-defective product determination is 10% and defective product determination is 90%, and a ratio of a judgement result has largely changed. In this case, the estimation model potentially cannot output a correct result, and thus it is determined that model update is needed.

Alternatively, model update may be performed when the tendency of the output result from the estimation unit 18 has become a particular predetermined state. For example, model update may be performed when a ratio of shots for which defective product determination is performed is equal to or higher than a threshold value for a plurality of latest shots.

For example, when the estimation model can output, for a target shot, probability as non-defective product and probability as defective product (hereinafter referred to as non-defective product probability and defective product probability, respectively), a number of shots for which the non-defective product probability or the defective product probability satisfies a certain condition may be counted for a plurality of latest shots, and model update may be performed when the number of shots is equal to or larger than a certain number. When the certain condition is set such that, for example, "the non-defective product probability is close to 0.5 (for example, 0.4 to 0.6 inclusive)", a number of shots for which the estimation model has difficulties in determination as a non-defective product or a defective product can be counted.

Alternatively, whether model update is needed may be determined by comparing tendency (for example, distribution) of the non-defective product probability or the defective product probability for a plurality of latest shots with tendency of the non-defective product probability or the defective product probability for a plurality of past shots.

When the estimation model is a model for calculating time series data through regression or an auto encoder model for inputting and reconstructing time series data, an error between a value calculated through regression and an actual value or an error between reconstructed data and input time series data may be calculated for a plurality of latest shots, and model update may be performed by using tendency of the error. For example, it is determined that model update is needed when an average of the error for a plurality of shots is equal to or larger than a threshold value or is too large or too small as compared to past.

The product state estimation device 1 configured as described above can perform generation of the estimation model M for the state of a product manufactured by the die-casting machine 5 and determination of the state of the manufactured product using the generated estimation model M.

(Effects)

Subsequently, operation of the above-described product state estimation device 1 will be described below.

First, processing of generating the estimation model M at the estimation model generation device 3 will be described below.

Figure 14:
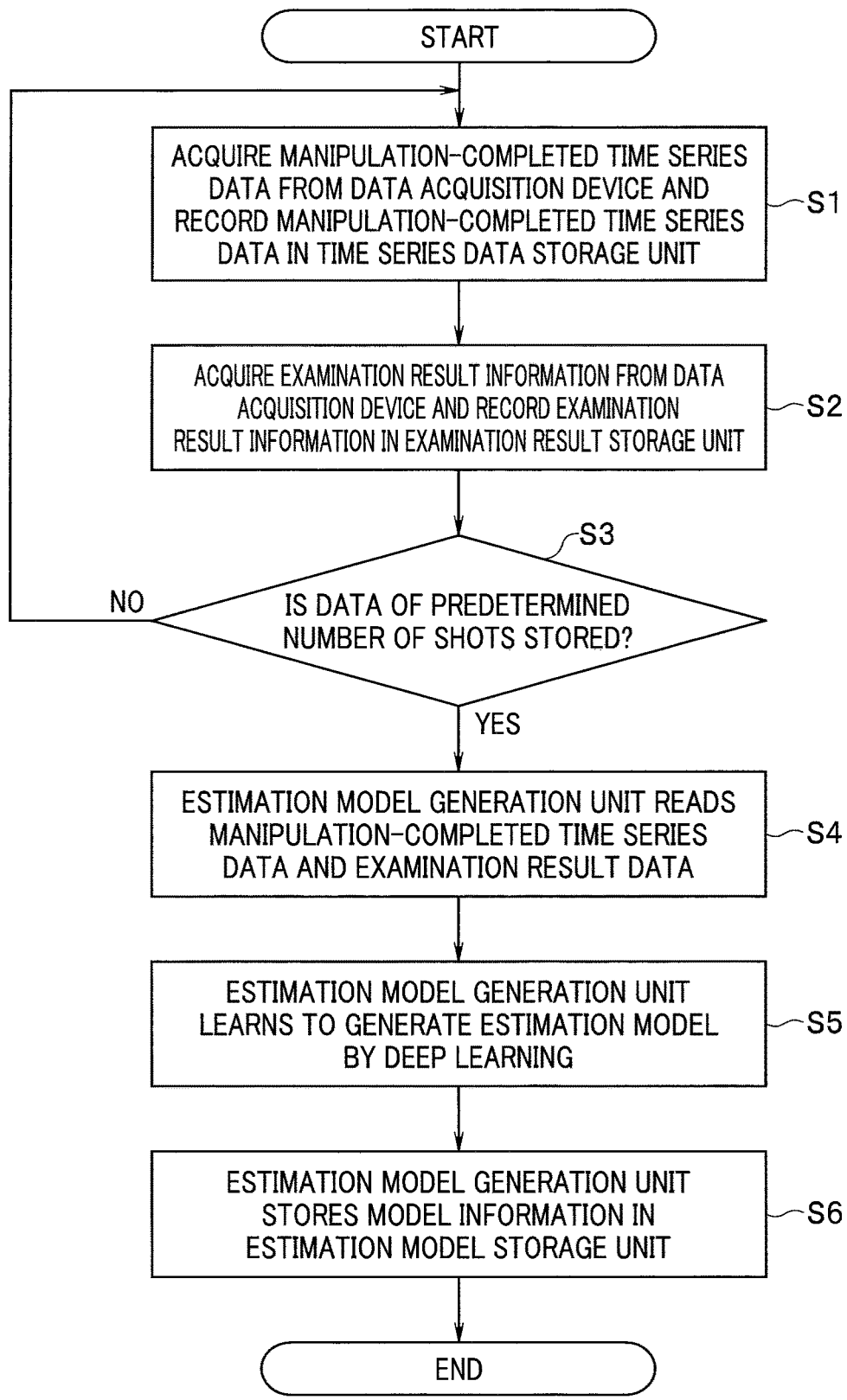
FIG. 14 is a flowchart illustrating an example of operation of an estimation model generation device 3 according to the embodiment.

FIG. 14 is a flowchart illustrating an example of operation of the estimation model generation device 3.

The estimation model generation device 3 includes a processor as described above, processing in FIG. 14 is processing achieved by a software program, and the software program is executed by the processor of the estimation model generation device 3.

The estimation model generation device 3 acquires manipulation-completed time series data from the data acquisition device 2 and records the manipulation-completed time series data in the time series data storage unit 14 (step (hereinafter abbreviated as S) 1).

The estimation model generation device 3 acquires the examination result information IS from the data acquisition device 2 and records the examination result information IS in the examination result storage unit 15 (S2).

The estimation model generation device 3 determines whether data of a predetermined number of shots is stored (S3). Specifically, it is determined whether a predetermined number of pieces of the manipulation-completed time series data and a predetermined number of pieces of the examination result information IS are stored in the time series data storage unit 14 and the examination result storage unit 15, respectively.

When data of the predetermined number of shots is not stored (NO at S3), the processing returns to S1.

When the predetermined number of pieces of the manipulation-completed time series data and the predetermined number of pieces of the examination result information are stored in the time series data storage unit 14 and the examination result storage unit 15, respectively (YES at S3), the estimation model generation unit 16 reads, as learning data, the predetermined number of pieces of the manipulation-completed time series data and the predetermined number of pieces of the examination result information IS stored in the time series data storage unit 14 and the examination result storage unit 15, respectively (S4).

After S4, the estimation model generation unit 16 performs learning by deep learning (S5). Specifically, the estimation model generation unit 16 generates the estimation model M by using the learning data.

After S5, the estimation model generation unit 16 transmits the model information MI of the generated estimation model M to the defect estimation device 4 and stores the model information MI in the estimation model storage unit 17 (S6). Subsequently, operation of the defect estimation device 4 will be described below.

Figure 15:
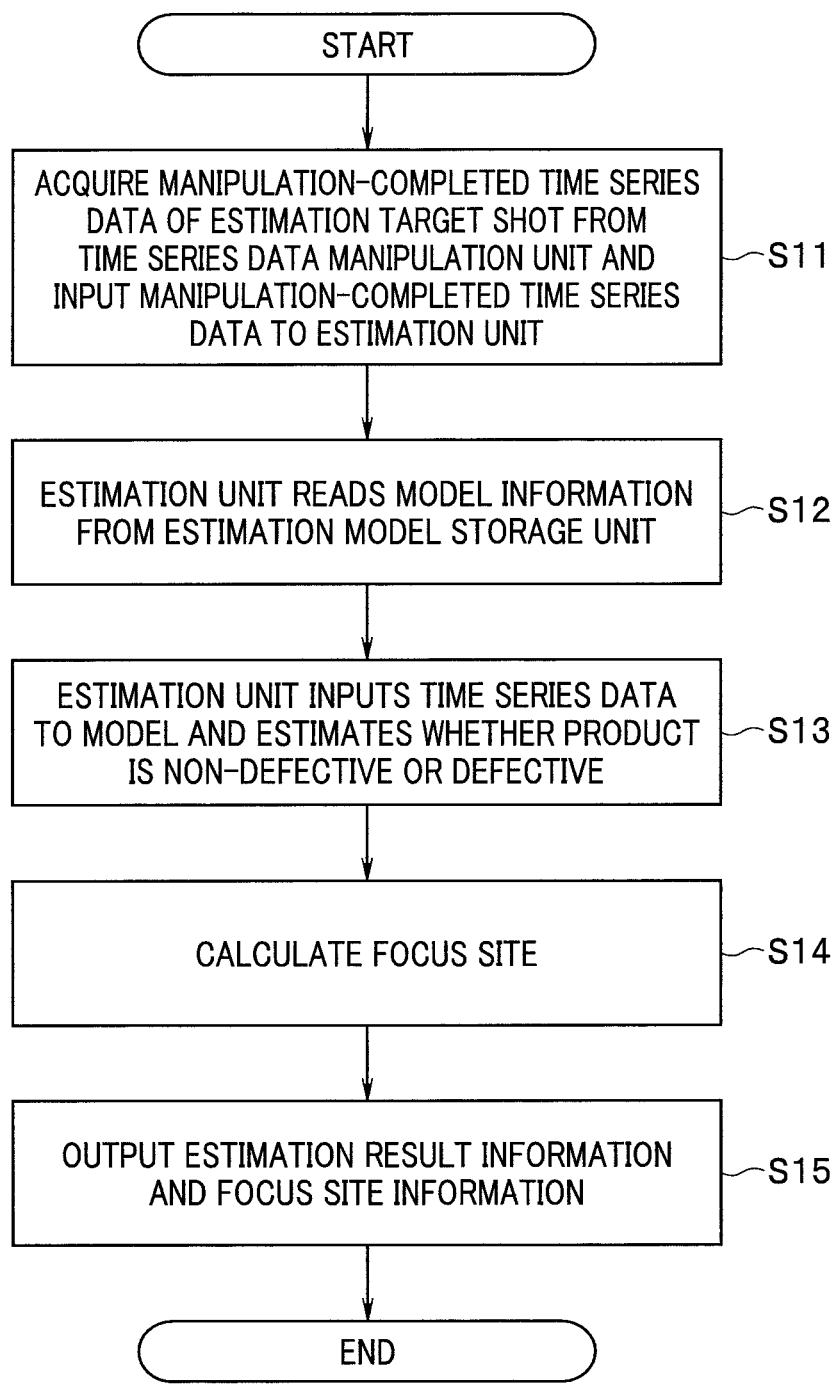
FIG. 15 is a flowchart illustrating an example of operation of a defect estimation device 4 according to the embodiment.

FIG. 15 is a flowchart illustrating an example of operation of the defect estimation device 4.

The defect estimation device 4 includes a processor as described above, and processing in FIG. 15 is a software program. The processing in FIG. 15 is executed by the processor of the defect estimation device 4.

The defect estimation device 4 acquires manipulation-completed time series data of an estimation target shot from the time series data manipulation unit 12 of the data acquisition device 2 and inputs the manipulation-completed time series data to the estimation unit 18 (S11).

The time series data acquisition unit 11 of the data acquisition device 2 receives signals from the position sensor 5b and the pressure sensor 5c in accordance with operation of the die-casting machine 5 and generates three pieces of time series data. The three pieces of generated time series data are manipulated at the time series data manipulation unit 12. Accordingly, the time series data manipulation unit 12 provides, on the acquired time series data, manipulation similar to the estimation model generation processing, and thus the estimation unit 18 acquires time series data manipulated similarly to manipulation-completed time series data stored in the time series data storage unit 14.

For example, the above-described three pieces of time series data DA1, DA2, and DA3 are supplied from the time series data manipulation unit 12 to the estimation unit 18 at each shot.

The estimation unit 18 reads the model information MI of the estimation model M from the estimation model storage unit 17 (S12).

The estimation unit 18 inputs manipulation-completed time series data to the estimation model M and estimates whether a product is a non-defective product or a defective product (S13). In other words, the estimation unit 18 performs estimation for the manipulation-completed time series data by using the model information MI.

Note that, in the defect estimation device, the model information MI is read from the estimation model storage unit 17 at S12 in this example, but the estimation unit 18 may read the model information MI in advance before start of the processing at S11.

After S13, the focus site calculation unit 19 calculates the focus site (S14).

After S14, the estimation unit 18 and the focus site calculation unit 19 outputs the estimation result information U as an estimation result and focus site information (S15). The estimation result information IJ is output to the estimation result output unit 20 and the estimation result presentation unit 21, and the focus site information is output to the estimation result presentation unit 21.

The estimation result presentation unit 21 transmits the estimation result information IJ to the control device and the like of the production line at a later process of the die-casting machine 5. For example, when having received the estimation result information IJ that the product is a defective product, the control device of the production line executes processing to prevent fabrication at a later process and the like from being performed on the product estimated as a defective product.

For example, when having received the estimation result information IJ that the product is a defective product, the estimation result presentation unit 21 displays, as a message on a display device such as a monitor, that the defective product is manufactured at the die-casting machine 5, and displays, on the display device, an image illustrating the focus site as illustrated in FIG. 13. As a result, an operator of the production line can adopt predetermined measures.

As described above, according to the embodiment, it is possible to estimate whether a product manufactured by the die-casting machine 5 is a non-defective product or a defective product after a shot, and thus a product suspected as a defective product is not transferred to later fabrication processing, and futile fabrication processing can be reduced.

A defect generated at a shot is thought to be affected by the position and speed of the plunger P or the like at the shot, the pressure in the runner R at the shot, and the like. For example, a nest as a die-casting defect is generated as gas is blown into a mold by a shot in some cases, and existence of the nest and a size of the nest change with an amount of the blown gas. It is difficult to directly measure the blown gas amount, but a minute change potentially occurs to behavior of the plunger P at injection in accordance with the gas amount, and thus the existence of the nest, the size of the nest, and the like can be potentially estimated by detecting the change.

Thus, in the above-described embodiment, whether a product obtained at each shot is a non-defective product or a defective product is estimated based on time series data of the position and speed of the plunger P and the like to detect a minute change in the behavior of the plunger P.

Figure 16:
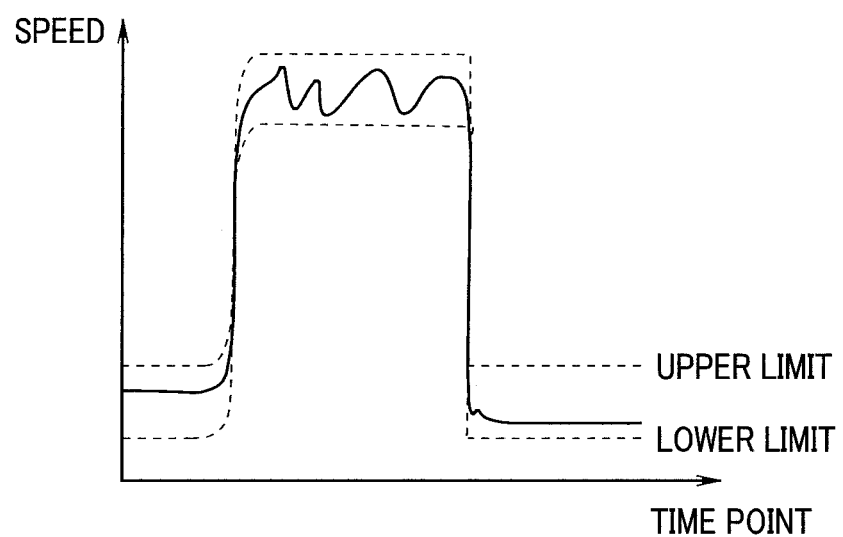
FIG. 16 is a diagram illustrating an example of time series data having minute variation according to the embodiment.

FIG. 16 is a diagram illustrating an example of time series data having minute variation. FIG. 16 illustrates a waveform of time series data of the speed of the plunger P. In a conventional method of performing quality determination of a molded product based on whether change of the speed data is between predetermined upper and lower limit waveforms (illustrated with dotted lines) set based on a reference waveform, minute speed variation illustrated with a solid line is not considered in the quality determination. In other words, minute variation in the injection speed or the like can lead to generation of gas or the like, and influence of the minute variation on the quality of a product is not considered.

In a case of the waveform data in FIG. 16, since the waveform data is between the upper and lower limit waveforms, no minute variation of the waveform data is detected. This is same for waveform data other than speed.

However, according to the above-described embodiment, the quality of a product manufactured by an injection molding machine or a die-casting machine can be determined or estimated with consideration on the minute variation illustrated with the solid line.

According to the present embodiment, defect generation can be estimated when minute variation of time series data affects nest generation.

Thus, according to the above-described embodiment, it is possible to provide the product state estimation device for estimating the state of a product, which can take into consideration not only significant variation but also minute variation in the operation state of an injection molding machine or a die-casting machine.

Note that the above-described embodiment is described with reference to an example of a product manufactured by a die-casting machine, but is also applicable to manufacturing of a product by an injection molding machine.

The estimation model generation device 3 and the defect estimation device 4 are separate devices but may be configured as one device.

The estimation model generation device 3 may be connected with the data acquisition device 2 and the defect estimation device 4 through a network. For example, the estimation model generation device 3 may be remotely installed and connected with the data acquisition device 2 and the defect estimation device 4 through the Internet.

While certain embodiments have been described, these embodiments have been presented by way of example only, and are not intended to limit the scope of the inventions. Indeed, the novel embodiments may be implemented in a variety of other forms; furthermore, various omissions, substitutions and changes may be made without departing from the gist of the inventions. The accompanying claims and their equivalents are intended to cover such forms or modifications as would fall within the scope and gist of the inventions.

What is claimed is:

1. A product state estimation device for estimating a state of a product manufactured by an injection molding machine or a die-casting machine, the product state estimation device comprising:
    an examination result acquisition device configured to acquire an examination result related to the state of the product obtained through each of a plurality of shots;
    a time series data acquisition device configured to acquire a plurality of pieces of time series data based on an output from a sensor configured to detect an operation state of the injection molding machine or the die-casting machine at each of the plurality of shots;
    a time series data manipulation device configured to synchronize the plurality of pieces of the acquired time series data and then clip a plurality of pieces of data of a clipping interval out of the plurality of pieces of time series data, and configured to connect the plurality of pieces of clipped data in series as one piece of vector data, or connect the plurality of pieces of clipped data in parallel;
    an examination result storage device configured to store the examination result acquired by the examination result acquisition device;
    a time series data storage device configured to store, as manipulated time series data, the plurality of pieces of clipped data connected in series or in parallel by the time series data manipulation device;
    an estimation model generation device configured to generate, by using a neural network with the examination result and the manipulated time series data as learning data, an estimation model based on any one or more models among an identification model for a label of the examination result, a regression model for an index related to the examination result, a regression model for calculating data of a time point or a time interval in the manipulated time series data through regression from data of another time point or another time interval in the manipulated time series data, and an auto encoder model for compressing and reconstructing the manipulated time series data;

an estimation model storage device configured to store the estimation model generated by the estimation model generation device;

an estimation device configured to estimate, by using the estimation model stored in the estimation model storage device, information related to quality of the product based on the manipulated time series data at each of the plurality of shots; and an estimation result output device configured to output information related to a result of the estimation by the estimation device, wherein the time series data storage device is configured to set the clipping interval in which a time point before a first predetermined time from a time point when it is detected that a change amount of time series speed data has become equal to or larger than a predetermined value is set as a start time point of clippings, and a time point after a second predetermined time from the start time point of clipping is set as an end time point of clipping, and to clip the plurality of pieces of data of the clipping interval out of the plurality of pieces of time series data.

2. The product state estimation device according to claim 1, wherein the time series data manipulation device performs manipulation that converts the plurality of pieces of clipped time series data into trajectory data by plotting the plurality of pieces of clipped time series data for each of a plurality of time points in a multi-dimensional space having axes corresponding to the respective pieces of clipped time series data and by connecting a plurality of plotted coordinates in the multi-dimensional space in an order of the plurality of time points with lines.

3. The product state estimation device according to claim 2, wherein the multi-dimensional space is a two-dimensional space, and the trajectory data is two-dimensional data displayable on a display device.

4. The product state estimation device according to claim 1, further comprising an estimation result presentation device configured to present the estimation result to notify a user of the result of the estimation by the estimation device.

5. The product state estimation device according to claim 1, further comprising a focus site calculation device configured to calculate, as a focus part, part of the manipulated time series data focused when the estimation model used by the estimation device to estimate the information related to the quality of the product calculates the estimation result, by partially differentiating, with the manipulated time series data, output data of the estimation model or a value calculated based on the output data or by comparing output data of the estimation model or part of the output data with the manipulated time series data or part of the manipulated time series data.

6. The product state estimation device according to claim 1, further comprising a model update determination device configured to determine whether the estimation model needs to be updated, based on the result of the estimation by the estimation device or based on the result of the estimation by the estimation device and the examination result acquired by the examination result acquisition device.

7. The product state estimation device according to claim 6, wherein the model update determination device determines that the determination model needs to be updated when an incorrect answer rate or a correct answer rate of the estimation result calculated from the estimation result and the examination result is equal to or higher than or lower than a predetermined threshold value.

8. The product state estimation device according to claim 1, wherein the neural network includes any one or more of three neural networks of a fully-connected multi-layer perceptron, a convolutional neural network, and a recurrent neural network.

* * * * *